April 16, 1963 M. V. FRIEDELL ETAL 3,085,654
LUBRICATOR ASSEMBLY
Filed May 4, 1960 2 Sheets-Sheet 1
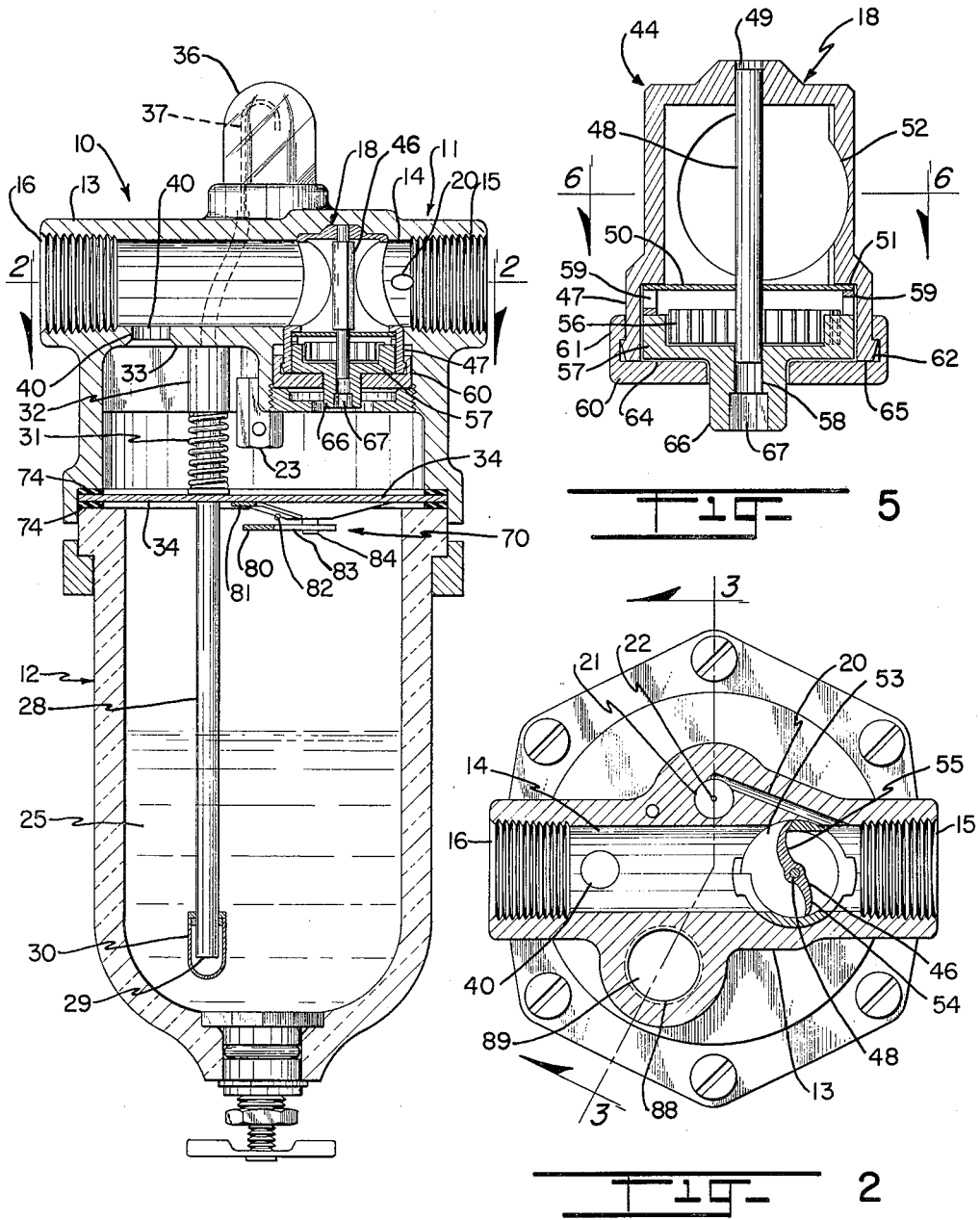
INVENTORS.
MORLEY V. FRIEDELL
ROLF SCHAFFRANKE
BY
Philip H. Sheridan
ATTORNEY

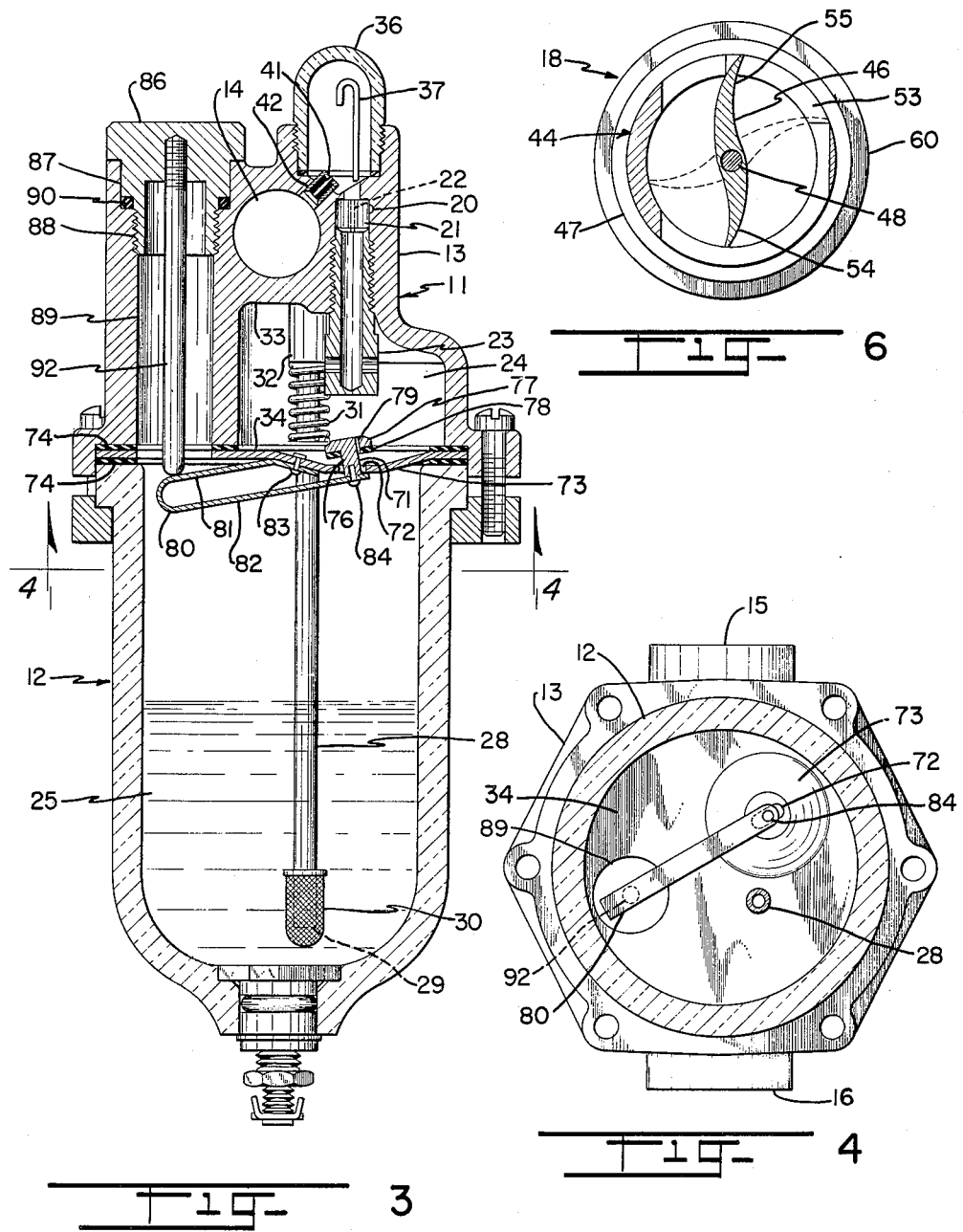

United States Patent Office 3,085,654
Patented Apr. 16, 1963

3,085,654
LUBRICATOR ASSEMBLY
Morley V. Friedell, Wheatridge, and Rolf Schaffranke, Denver, Colo., assignors to C. A. Norgren Co., Englewood, Colo., a corporation of Colorado
Filed May 4, 1960, Ser. No. 26,887
11 Claims. (Cl. 184—55)

This invention relates to a novel and improved lubricator for the delivery of oil in the form of a mist or fog into a flow line, and more specifically relates to an improved pressure control unit and a valve control unit in a lubricator which enable installation in a flow line for continuous operation in the delivery of a selected quantity of oil in the form of a lubricant mist for effective lubrication of any one or a number of tools operating off of the line without adjustment or interruption in operation.

It is accordingly a principal object of the present invention to provide a lubricator assembly which may be continuously operated without necessity of adjustment over a wide range of flow conditions in the delivery of lubricant fog through a flow line under pressure in the operation of various tools, and in which the supply of lubricant in the lubricator may be periodically restored without interrupting the normal flow of air or other fluids under pressure through the lubricator.

It is another object of the present invention to overcome a number of disadvantages and drawbacks in prior known lubricators, and specifically to provide for an improved pressure control unit over that disclosed and claimed in co-pending application, filed July 19, 1955, Serial No. 523,053, and entitled Fluid Pressure Differential Control, assigned to the assignee of the present invention and now issued as U.S. Patent No. 2,990,848.

It is a further object to provide for a novel and improved lubricator which is conformable for use in the lubrication of various types and sizes of pneumatically operated devices and which is capable of supplying an optimum average quantity of lubricant in the form of a mist to one or a number of such devices operating off a common flow line without necessity of adjustment notwithstanding variations in flow conditions in the line.

It is another object to provide for a novel and improved valve control in a lubricator which, when the latter is installed in an air flow line and the like, permits refilling of the lubricator without removal or interruption of the flow through the lubricator, and further in such a way as to prevent flooding or overfilling of the device, while further permitting complete drainage of foreign or heavy oil particles in the lubricator and thus in general to enable continuous operation of the lubricator without danger of malfunctioning in any way.

It is an additional object to provide in a lubricator a greatly simplified, novel and improved pressure control unit which when the lubricator is installed in an air flow line under pressure a predetermined or constant pressure differential may be selectively established across the lubricator under changes in pressures or flow conditions in the line so as to enable delivery of an optimum average quantity of oil through the line in the lubrication of one or plurality of oil tools and without necessity of periodic adjustment of the unit during operation; or alternatively to permit selective variation in the pressure differential established at a definite, predetermined ratio with respect to variations in line pressure and flow conditions; and furthermore wherein the above may be accomplished through the use of an improved pressure control unit which is virtually frictionless resulting in extreme sensitivity to minor flow changes and maintenance of a selected pressure differential within very close limits.

Yet another object is to specifically provide for delivery of an optimum average quantity of oil through a flow line in the form of a lubricant mist for either constant or intermittent lubrication of one or a number of air operaed tools in such a way as to avoid either underlubrication or excessive lubrication of the tools and without necessity of periodic adjustment of the control unit.

The above and other objects and advantages of the present invention will become more apparent from the following detailed description of a preferred embodiment of the present invention taken together with the accompanying drawings, in which:

FIGURE 1 is a vertical section view illustrating a preferred form of lubricator assembly, in accordance with the present invention.

FIGURE 2 is a view partially in section and taken on line 2—2 of FIGURE 1.

FIGURE 3 is another vertical section view taken on line 3—3 of FIGURE 2.

FIGURE 4 is a horizontal section view taken on line 4—4 of FIGURE 3.

FIGURE 5 is a detailed section view of the improved pressure control unit, in accordance with the present invention; and FIGURE 6 is a detail view taken on line 6—6 of FIGURE 5.

For the purpose of more specifically defining the areas of improvement of the present assembly over those now known to the art, such as that disclosed in the hereinbefore referred to co-pending application and other similar known lubricating devices, the present invention will be described in relation to the installation of the lubricator in an air line which is employed to supply air under pressure to a number of pneumatically operated tools and wherein the lubricator is specifically employed to introduce into the line a selected quantity of lubricant fog which is further atomized by the air flowing through the line for delivery to the various devices. Lubricators of this type are most desirably installed in-line just ahead of the air control valve for the various tools. Once installed, it is very advantageous if the lubricator can remain a permanent part of the line; that is, it is not necessary either to interrupt the flow of air under pressure through the system nor to remove the lubricator either for the purpose of adjustment to meet varying conditions of flow or pressure through the line or for the purpose of replenishing the supply of lubricant in the reservoir for the lubricator and, in other words, to be capable of supplying at all times the required amount of oil for effective lubrication of the tools being operated without necessity of interruption for any reason.

A number of problems must be overcome to accomplish the above and, among others encountered, is the fact that where, as here, in the operation of the lubricator of the present invention, the supply of oil is dependent on the flow of air therethrough to atomize the lubricant to form a fog of suspended oil particles, the quantity of oil or concentration thereof in relation to the amount of air will be dependent upon the pressure differential established between the inlet and outlet sides of the lubricator, this pressure differential usually being accomplished in accordance with conventional practice by means of some suitable restriction such as a vane, venturi or valve placed in the main air passage. However, it has been found that for most effective lubrication especially in situations where one or more tools are being operated intermittently off of a common air line, an average concentration of lubricant must be established which accurately varies with changes in air flow; otherwise, when one tool is being operated off the line the pressure drop across the lubricator is extremely low and the oil supplied in concentration is likely to be well below the necessary amount for adequate lubrication of the tool. On the other hand, when a number of tools are being simultaneously operated, and assuming that a constant restriction or metering device is being employed the pressure drop would become very high and the oil concentration could be such as to bring about excessive lubrication of the various parts of the tools.

In accordance with the present invention, a predetermined variable or constant pressure differential may be established across the lubricator, depending upon the conditions of use, so that in operation the lubricator is capable of supplying an optimum average quantity of oil over a wide range of line pressures and variations in flow conditions without necessitating periodic adjustments either in oil feed or air flow and thereby permit fully automatic operation within the specified flow range for either constant or intermittent use of one or a plurality of tools, and while providing adequate lubrication for the tools under all operating conditions.

In addition, in the generation of lubricant fog for delivery through the air line it is of course necessary at periodic intervals to replenish the supply of lubricant and again, since the rate of oil feed depends upon the pressure differential established in the lubricator, the lubricant in the reservoir must also under normal operating conditions be under line pressure and this in turn requires that the reservoir be in communication with the air line or generator portion of the lubricator. However, it is apparent that when the reservoir is opened to the atmosphere for the purpose of refilling that a sudden drop in pressure would occur in the reservoir in relation to the line pressure, and accordingly there is the added danger of flooding or reverse flow of the lubricant into the generator portion, and in any event the normal pressure conditions within the lubricator would be completely upset. Moreover, adequate provision must be made for settling of heavy oil particles or foreign matter in the lubricator and further provision must be made to prevent overfilling of the reservoir. In the present invention the above adverse conditions are avoided by means of a novel valve control unit interposed between the generator portion and reservoir of the lubricator in a manner to be hereinafter explained in more detail and in such a way as to again permit continuous operation of the lubricator and continuous operation of the tools under normal line pressures while the filling operation is taking place.

Referring in more detail to the drawings there is shown by way of illustrative example a lubricator assembly 10 comprised broadly of an upper generator portion 11 and a lower reservoir portion 12 and wherein a body 13 serves to house all the parts forming the generator portion. The body is in the general form of a cylinder and to provide for installation of the lubricator assembly for example in an air line, not shown, a horizontal air passage 14 passes through the upper part of the lubricator including a threaded inlet 15 at one end and a threaded outlet 16 at the opposite end thereof for connection to suitable fittings, not shown, of a compressed air flow line for the delivery of a lubricant to the tool or tools to be lubricated. In order to meter the flow of air through the lubricator assembly, pressure control unit 18 of the present invention is positioned to extend across the path of flow through the passage and in a manner to be described, maintain a variable pressure drop between the inlet 15 and the outlet 16 notwithstanding variations in the capacity and velocity of flow through the passage.

In a well known manner, a portion of the air flowing through the passage is directed through an auxiliary air passage 20 extending angularly from communication with the air passage 14 adjacent to the inlet end 15 into venturi plug 21. From there the air is directed through a vertically disposed orifice 22, diffusion plug 23 and a lubricant fog settling chamber 24. It is this passage of air at a predetermined velocity through the venturi plug and orifice (velocity in turn being of course dependent upon the pressure drop across the main passage 14) which creates a reduction in pressure in the system to induce the upward flow of oil from the reservoir for mixture with the air before it passes into the settling chamber 24.

In order to conduct the lubricant, indicated at 25 in the reservoir, from the reservoir a supply tube 28 is positioned for downward suspension into the body of the liquid lubricant and this tube includes a lower intake portion 29 having a strainer 30 surrounding the intake in order to prevent the entry into the tube of any foreign matter which may be present in the lubricant. In addition, a coiled spring 31 and sleeve portion 32 may be provided on the upper end of the supply tube 28 to securely mount the tube between lower wall portion 33 of the passage 14 and a partition wall 34 which serves to separate the generator portion and reservoir portion of the lubricator. From the sleeve portion 32 the supply tube projects upwardly through the thickness of the body into a sight feed dome 36 mounted on top of the lubricator and the upper extremity of the tube 28 includes a sight feed tube 37 having its terminal end facing downwardly toward the venturi plug and orifice through which the air from the auxiliary passage 20 is directed. In this relation, as the air passes through the orifice the reduced pressure created in the sight feed dome 34 serves to induce the release of the oil from the reservoir through the end of the sight feed tube 37 for mixture with this air flow prior to its exit from the diffusion plug 23 into the chamber 24.

The force of the air as it is caused to flow through the orifice and downwardly through the diffusion plug 23 into the chamber 24 operates to thoroughly intermix the oil droplets from the sight feed tube with the air and to divide the oil into very fine particles and essentially to form with the air an aerosol or lubricant fog. Any matter or heavier particles of oil tend to settle out by gravity in the chamber, whereas the fine particles are carried with the air through passage 40 (see FIGURE 1) into the main passage 14 for delivery with the main air stream through the outlet 16 and the air line.

Apart from the induced flow of oil caused by the passage of air through the orifice adjacent to the sight feed dome, an interchangeable orifice plug 41 is shown inserted in an angularly and downwardly directed opening 42 extending between the lower end of the sight feed dome and the main passage 14. It is a function of this plug 41 to control the flow of oil from the sight feed tube 36, by bleeding air into the dome chamber from the air supply so as to regulate the basic initial drip-rate of the oil.

Again, referring to the pressure control unit 18, this is preferably in the form of a separate cartridge assembly having an outer casing portion 44 which houses a variable vane unit 46 for extension across the path of flow through the main passage 14 and also houses a lower pressure control portion 47, the latter in its particular construction and arrangement forming an important feature of the present invention.

As described in more detail in the co-pending application, Serial No. 523,053, the vane 46 is of a generally S-shaped configuration and is carried for rotation on a vertically disposed shaft 48, the upper end of the shaft being journaled in a sleeve bearing 49 formed in the top of the cartridge body and the lower end of the shaft extending through a thin metal divider disc 50 which separates the vane 46 from the pressure control portion 47. To cooperate with the vane in controlling the characteristics of flow of the air through the passage 14, the cartridge body is especially formed to be comprised at three stepped bores, there being a small chamfered bore at the upper end thereof to form the sleeve bearing 49, and at the opposite lower end a concentric bore forms a shoulder 51 for seating of the divider disc 50 in desired relation to the shaft. In addition, a transverse bore 52 extends horizontally through the cartridge body and this bore is formed for alignment once the cartridge is properly positioned in relation to the air passage 14 so as to be in eccentric coaxial relation to the air passage itself, and there is also formed a quarter segment 53 cut out of the upper wall of the body. In turn, the S-shaped control vane 46 includes wings 54 and 55 of unequal length, the short wing 54 being dimensioned to clear the inside of the transverse bore along one wall of the cartridge body and the longer wing 55 being disposed to move through the quarter segment 53 but to clear the wall of the main passage 14. As illustrated in FIGURE 2 for example the vane unit 46 is shown in the closed, no flow position, whereas in FIGURE 6 it is illustrated in full upon movement in response to the flow of air through the passage to a position substantially aligned with the axis of the passage so as to exert minimum restrictive effect upon the air flow thereacross.

The pressure control portion proper 47 as stated is designed in a greatly simplified but accurate way to control the pressure drop across the main air passage apart from the flow conditions which exist therein and specifically accomplishes this by controlling the rotational movement of the vane 46 to vary its restrictive effect upon the air as the air flow itself is varied. To do this and to accomplish it completely independently of the flow conditions which exist either in the main air passage or the oil feed line, a torsion spring 56 is positioned at the lower end of the shaft 48 and is nested securely in a spring adjusting plate 57, the latter member also forming a sleeve bearing 58 for journaled disposition of the lower end of the shaft for the vane 46. Spring washer 59 of annular configuration is mounted between the top surface of the adjusting plate 57 and bottom of the disc 50 to hold the plate under a constant, slight pressure, and in turn, the adjusting plate 57 and lower end of the cartridge body 44 are held together in desired relation by means of a retainer cup 60 which serves to connect the entire assembly of the pressure control unit together in sealed relation. Preferably, this is accomplished by forming the retainer cup of a flexible material and by means of an upper, spaced inturned flange 61 may be snapped over an outer annular shoulder 62 formed at the lower end of the cartridge body to secure a sealed connection.

The torsion spring 56 has its inner extremity secured firmly to the lower end of the shaft 48 and its outer extremity securely positioned in a radial slot not shown formed in the plate 57. Accordingly, for a given initial tension in the torsion spring 56 the vane member 46 may be biased for example in a clockwise direction as viewed in FIGURE 2 so as to close the main air passage 14 to the flow of air therethrough. Depending upon the initial tension given the spring it will be evident that an initial pressure differential must be established on opposed sides of the vane to overcome the urging of the spring in the opposite direction and to cause the vane to rotate in a counter-clockwise direction permitting the flow of air through the transverse bore 52 in the cartridge assembly. Thus, a definite relationship may be established between the tension of the spring and the pressure differential necessary to initiate rotation of the vane unit and in accordance with the present invention this relationship is utilized for selected regulation of the initial tension of the spring and thereby require a predetermined initial pressure drop between the inlet and outlet side of the passage before the vane unit will begin moving in a counter-clockwise direction. To accomplish this, a unique clutch arrangement is employed between the rotatable plate 57, and the stationary cartridge body 44 and retainer cup 60, each being provided respectively with inter engaging serrations 64 and 65. The serrations 64 are formed on the contacting surfaces of the plate 57 and the cup 60 such that the plate becomes locked securely to the retainer cup, and through the serration 65 the retainer cup is permanently locked in position to the end of the cartridge body. The above, coupled with the downward pressure exerted by the spring washer 59 causes the three parts in normal relation to be firmly and securely locked together to prevent relative movement therebetween. In order to regulate the amount of tension force in the spring the spring adjusting plate 57 includes a hub 66 projecting downwardly through a central opening in the retainer cup 60 and the hub may be suitably formed with a hex-shaped depression 67 which is adapted to receive an Allen wrench therein. By applying an upward pressure through the hub it is possible to overcome the pressure of the spring washer 59 and to disengage the serrations between the spring adjusting plate and retainer cup and thus permit rotation, by turning of the wrench, of the spring adjusting plate 57 relative to the retainer cup 60 so as to wind up the spring 56 until the desired tension is stored therein. Then, by releasing the wrench the downward pressure of the spring washer 59 will of course cause the plate to return into engagement with the retainer cup so that the parts are held firmly in locked position and the spring 56 is under the desired constant tension.

By experiment it can be determined just how much spring tension is necessary in order to allow the vane 46 to begin moving in a direction opening the air passage when a predetermined pressure differential has been reached. Accordingly, and assuming that the inlet 15 is connected to an air pressure source under a line pressure of 80 p.s.i. and that the outlet is connected just ahead of an air control valve supplying the air tools, when the air control valve is closed then there will be 80 p.s.i. in the lubricator, but no differential pressure between the inlet and outlet so that the control vane will remain in a closed position as shown in FIGURE 2. However, opening the air control valve slowly, some air will flow or leak past the slight clearances left at the sides and ends of the vane 46 and as the air control valve is opened further gradually sufficient pressure differential will be established between the inlet and outlet to overcome the closing force of the spring and accordingly the vane 46 will begin movement in a counter-clockwise direction. The aerodynamic shape of the vane together with the configuration of the passage through the cartridge assembly and the closing force of the spring will nevertheless continue to exert a restrictive effect upon the flow of air through the passage so that the pressure differential, and thus the oil feed rate, are selectively varied from the initial predetermined amount in accordance with variations in the flow of air therethrough. At a maximum flow, the long wing of the vane will have reached the edge of the segment opening and a minimum resistance is offered to the air flow since the combined effects of velocity and pressure on the vane have been used to overcome the increasing tension of the spring while maintaining a constant pressure differential thereacross.

Another highly important feature of the present invention resides in the use of a valve control unit generally indicated at 70 which serves to regulate presure conditions in the lubricator whenever it is desired to add a new supply of lubricant to the reservoir. In a standard air tool lubricator it is generally necessary to shut off the line pressure before the oil reservoir can be refilled since otherwise the sudden reduction in pressure in the reservoir will cause flooding by reverse flow of the oil into the generator portion and the main air passage. Of course, closing the line would mean that the entire operation must be suspended until the lubricator is again resealed. The above is avoided by the novel valve control unit 70 which is formed essentially of a valve member 71 extending through an opening 72 formed in a dish-shaped depression 73 of the partition 34. The partition itself is preferably formed of a steel plate of sufficient thickness to withstand substantially more than the maximum air line pressure that would be imposed thereon and the plate is sandwiched between the lubricator body 13 and reservoir portion 12 with annular gaskets 74 positioned around the periphery on opposed sides thereof so as to provide a positive airtight division between the upper generator portion 11 and reservoir 12.

The valve member 71 includes a stem 76 projecting through the opening with an enlarged head portion 77 having a soft annular sealing portion 78 forming a seat for engagement with the depressed part of the partition 34 surrounding the opening 72, and the portion 78 also has a bleeder opening indicated at 79 for a purpose to be described. The valve is mounted for movement between an opening position as shown in FIGURE 3 and a closing position shown in FIGURE 1 by means of a resilient member preferably in the form of a leaf spring 80 having an upper leg portion 81 and lower leg portion 82, the upper leg being attached to the depressed part of the partition 34 by means of a suitable rivet 83. The lower leg portion 82 in turn serves to carry the valve member 71 at its outer extremity and the valve may be suitably secured to the top surface of the leg 82 such as by means of a screw 84 projecting upwardly through the leg for attachment to the valve member.

To enable access from the exterior of the lubricator into the reservoir portion, a suitable filler plug 86 having an exterior threaded counter-bored portion 87 is shown positioned in a threaded opening 88 formed in the top of the generator portion of the lubricator with a vertical passage 89 extending downwardly from the opening into communication with the reservoir. In addition, an annular O-ring seal 90 is shown positioned just above the threaded portion of the plug to provide for sealed engagement with a shoulder formed in the opening 88 so that the desired pressure may be built up in the reservoir without danger of escaping through the filler opening. In addition, an elongate plunger rod 92 is mounted for downward projection from the filler plug 86 through the vertical passage 89 and the plunger is dimensioned to be of a length sufficient to engage the upper leg portion 81 of the leaf spring 80 when the filler is threaded into the opening 88. It is the purpose of the plunger to bias the leaf spring to a position urging the valve member upwardly toward the open position under normal operation when the reservoir is sealed from the atmosphere. This is of course necessary to establish a reduction in pressure caused by the air passing through the orifice 22 in relation to the line pressure in the reservoir so as to induce the upward flow of liquid through tube 28.

When the filler plug and attached plunger are removed from the opening, as for instance in the filling of the reservoir, the leaf spring 80 will tend to move upwardly into a horizontal position; and as seen from FIGURE 1, the lower leg portion will urge the valve member 71 into a closed position with the sealing surface 78 engaging the partition 34 and closing the opening 72. Of course the pressure differential between line pressure in the generator portion and atmospheric pressure in the reservoir acting on the relief valve will help to maintain it in a closed position until pressure is again restored in the reservoir portion. This is brought about, once the refilling operation is completed and once the plug is replaced, as follows: The plunger 92 will move into engagement with the free end of the leaf spring 80 to force that end downwardly and to flex the free end of the leg portion 82 such that it will tend to urge the valve member away from the closed position toward the open position shown in FIGURE 3. At the same time, the bleeder opening is formed to permit constant air leakage in order to gradually equalize the air pressure in the respective portions of the lubricator and under the force of the plunger biasing the spring, the valve will quickly move into the fully opened position to restore full line pressure above the oil level in the reservoir and thereby act to pump oil up through the oil tube for delivery through the sight tube in forming the lubricant mist.

Clearance is also formed around the stem of the relief valve as shown so as to permit complete and constant drainage of any heavy oil particles formed in the chamber 23 into the reservoir portion when the valve is in the open position. In addition, the filler plug 86 is preferably designed with a bleed area at its upper end a certain distance such that air is allowed to leak past the ring 90 after the plug has been partially unthreaded to reduce the air pressure in the reservoir and thereby avoid popping of the filler plug when disengaging its last thread from the opening.

The bleed opening in the valve also serves to indicate to the operator during the process of refilling when the maximum oil level has been reached. As the oil level reaches the partition 34 the oil surface is given a foaming or boiling appearance due to the air flowing through the bleed opening from the upper chamber thus indicating that the maximum level has been reached. In addition, in the event that additional oil is poured into the reservoir, the oil will merely overflow through the vertical passage or filler hole due to the valve being closed.

While the preferred form of pressure control has been described in relation to establishing a variable pressure drop through the passage, it is apparent that by selective construction of the spring and vane the pressure differential may be held constant, notwithstanding variations in flow conditions, essentially by controlling the spring size and resultant opening across the vane at different flow conditions. Similarly, the valve control unit may undergo slight changes such as in the construction of the valve member and the spring together with the manner of urging the spring and valve from one position to another. Moreover the exact location of the fill opening may be varied considerably with the arrangement of the present invention since it in no way is associated with the valve proper for the reservoir.

It is to be further understood that various other modifications and changes may be made in the disposition and arrangement of parts forming both the pressure and valve control units in the lubricator without departing from the scope of this invention as defined by the appended claims.

What is claimed is:

1. A lubricator adapted for use in an air line and the like for the delivery of a controlled amount of lubricant therethrough comprising: a first portion including a passage having an inlet and outlet and generator means communicating with the inlet and outlet sides to deliver a selected amount of lubricant to the outlet side in accordance with a selected pressure differential, a movable vane in said passage to establish a pressure differential between the inlet and outlet notwithstanding variations in the rate and pressure of air flowing therethrough, a shaft for said vane with biasing means on said shaft urging said vane to a normally closed position blocking the flow of air through the passage and a clutch operably connected to said biasing means for selective adjustment of the biasing means to enable opening of said vane only in response to the development of a predetermined pressure differential in the passage; a second portion defining a lubricant supply reservoir including a supply tube communicating with said generator means and a removable access communicating with the reservoir for periodic filling thereof, and valve means interposed between said generator means and said reservoir being biased in a direction to establish communication between the reservoir space above the lubricant level and said generator when the reservoir is closed, said valve means being further biased in an opposite direction when said reservoir is open to the atmosphere to move to a closed position sealing said generator from the reservoir.

2. A lubricator adapted for use in an air line and the like for delivery of a controlled amount of lubricant therethrough comprising; a first portion including a passage having an inlet and outlet, an aerosol generator communicating with the inlet and outlet sides thereof to deliver a selected amount of lubricant to the outlet side in accordance with a selected pressure differential in the passage, a movable generally S-shaped vane in the passage to establish a pressure differential between the inlet and outlet notwithstanding variations in the rate and pressure of air flowing therethrough, a shaft for said vane with a hermetically sealed enclosure including biasing means therein connected to said shaft and urging said vane to a normally closed position blocking the flow of air through the passage, and clutch means operably connected to said biasing means being manually adjustable to control the initial tension of said biasing means for opening of said vane only in response to the development of a predetermined pressure differential in the passage; a second portion defining a lubricant supply reservoir including a supply tube communicating with said generator means and a removable access door to permit periodic filling of the reservoir; and valve means interposed between said generator and said reservoir being normally closed when said reservoir is open to the atmosphere to seal said generator from the reservoir, and with means movable into engagement with said valve means when said reservoir is closed to urge said valve means to an open position establishing communication between the reservoir and generator.

3. A relief valve assembly for a lubricator and the like in which the lubricator includes a first portion having a passage for the flow of air under pressure therethrough with means to deliver a selected quantity of lubricant into the passage in response to the flow of air under pressure therethrough, a chamber in said first portion in communication with said air under pressure where lubricant and air are mixed, a second portion having a lubricant supply reservoir from which lubricant is supplied by suction to said chamber, said second portion being provided with removable access means for the periodic supply of lubricant thereto, and a divider between said first and second portions, said valve assembly comprising a valve member extending through the divider between said chamber and said lubricant reservoir including a bleeder opening to establish communication therebetween, said pressure existing alike in said chamber and said lubricant reservoir when said valve member is open, and resilient means operably connected to said valve member, said valve member being movable to a closed position only when the pressure is reduced in the lubricant reservoir below that of the chamber in response to opening of the access means for the supply of lubricant thereto, said resilient means being responsive to closing of the access means to urge said valve member to an open position as the pressure gradually increases in the lubricant reservoir to that in said chamber.

4. A relief valve assembly for a lubricator and the like in which the lubricator includes a first portion having a passage for the flow of air under pressure therethrough, means to deliver a selected quantity of lubricant into the passage in response to the flow of air under pressure through the passage, a chamber in said first portion in communication with said air under pressure where lubricant and air are mixed, a second portion including a lubricant supply reservoir having a fill opening for the periodic supply of lubricant thereto, and a divider between the chamber and the lubricant reservoir, said valve assembly comprising a valve member extending through the divider between the first and second portions and resilient means carrying said valve member, said pressure existing alike in said chamber and said lubricant reservoir when said valve member is open, said valve member being movable to a closed position when the pressure is reduced in the lubricant reservoir below that in the chamber, and a removable plug to close the fill opening including a plunger dimensioned to flex said resilient member to a position urging said valve member toward an open position as the plug is inserted and as the pressure equalizes between said chamber and said lubricant reservoir.

5. A relief valve assembly according to claim 4 wherein said valve member is formed to establish constant limited communication between said first and second portions to provide for the gradual bleeding of pressure from said chamber to said lubricant reservoir to permit equalization of the pressure therebetween as said valve member is opened.

6. A relief valve assembly according to claim 4 wherein said valve member comprises a valve stem having a head attached at one end with a larger diameter than the stem and having a sealing surface on its underside, said valve member being positioned with the head in said chamber and the stem extending through an opening in said divider into said lubricant reservoir, and said resilient member is defined by a generally U-shaped leaf spring including one leg connected to the divider and the other leg secured to the other end of said stem and with the closed end thereof being disposed for engagement by said plunger whereby downward pressure on said closed end serves by a pivotal action to move said valve member upwardly to its open position with the sealing surface off of the divider.

7. In a lubricator for establishing a predetermined fluid pressure differential between the inlet and outlet sides of a passage wherein there is provided a generally S-shaped vane pivotally mounted in the passage for movement from a first position in which said vane extends across and substantially blocks the passage to a second position in which said vane is substantially parallel with the fluid flow through the passage together with a spring connected to the vane and biasing the vane toward the closed position, the combination therewith of a clutch comprising a hermetically sealed enclosure serving to house the torsion spring, a rotatable plate in said enclosure being connected to the outer free end of the spring and including means projecting from the enclosure to provide for manual rotation of said plate and connected spring, means normally interengaging between the adjacent surfaces of said rotatable plate and said enclosure to prevent relative movement between said plate and said enclosure in a direction causing the spring to unwind, and said plate and connected spring being free to rotate in a direction increasing the tension of the spring whereupon the pressure differential necessary to initiate movement of the vane toward the second position may be selectively regulated in accordance with the optimum average flow desired through the passage.

8. In a lubricator for establishing a predetermined fluid pressure differential between the inlet and outlet sides of a passage wherein there is provided a generally S-shaped vane pivotally mounted in a passage for movement from a first position in which said vane extends across and substantially blocks the passage to a second position in which said vane is substantially parallel with the fluid flow through the passage together with a torsion spring connected to the vane and biasing the vane toward the closed position, the combination therewith of a clutch comprising an outer stationary housing, a rotatable plate in said housing being connected to the outer free end of the torsion spring and including means projecting from the housing to provide for manual rotation of said plate and connected torsion spring, means normally interengaging between the adjacent surfaces of said rotatable plate and said housing to prevent relative movement between said plate and said housing in a direction causing the spring to unwind, and said plate and connected spring being free to rotate in a direction increasing the tension of the spring whereupon the pressure differential necessary to initiate movement of the vane toward the second position may be selectively regulated in accordance with the optimum average flow desired through the passage.

9. A lubricator according to claim 1, said biasing means being defined by a torsion spring and said clutch comprising an outer stationary housing, a rotatable plate in said housing being connected to the outer free end of the torsion spring and including means projecting from the housing to provide for manual rotation of said plate and connected torsion spring, means normally interengaging between the adjacent surfaces of said rotatable plate and said housing to prevent relative movement between said plate and said housing in a direction causing the spring to unwind, and said plate and connected spring being free to rotate in a direction increasing the tension of the spring whereupon the pressure differential necessary to initiate movement of said vane may be selectively regulated in accordance with the optimum average flow through the passage.

10. A lubricator for insertion in an air line for the introduction therein of a controlled amount of lubricant comprising: a first section including a passage having an inlet and an outlet for connection to the upstream and downstream sides, respectively, of an air line, generator means in said lubricator communicating with said passage and constructed to deliver an amount of lubricant to the outlet dependent upon a selected pressure differential in said passage, air flow control means in said passage movable by air pressure in the passage to vary air flow therethrough and means for adjusting its resistance to movement to establish selected pressure differentials between said inlet and outlet notwithstanding variations in the rate and pressure of air flowing through the passage; a second section defining a lubricant supply reservoir separated from said generator means by a partition and including a lubricant supply tube communicating with said generator means and a closable access communicating with said reservoir for filling thereof, and valve means in said partition between said generator means and said reservoir operative to establish communication therebetween when the reservoir is closed and to close off said communication when the reservoir is open to the atmosphere.

11. A lubricator according to claim 10 in which said air flow control means comprises a movable vane, a shaft for said vane having biasing means attached thereto biasing said vane to a normally closed position obstructing the flow of air through said passage, and adjustment means connected to said biasing means for selective adjustment of the biasing force of the biasing means to provide for the opening of said vane only in response to the development of a predetermined pressure differential in said passage.

References Cited in the file of this patent
UNITED STATES PATENTS

| | | |
|---|---|---|
| 1,907,045 | Curtis | May 2, 1933 |
| 2,268,806 | Curtis | Jan. 6, 1942 |
| 2,356,815 | Bischoff | Aug. 29, 1944 |
| 2,442,777 | Norgren | June 8, 1948 |
| 2,661,814 | Norgren et al. | Dec. 8, 1953 |
| 2,889,009 | Endebak et al. | June 2, 1959 |
| 2,921,649 | Wilkerson | Jan. 19, 1960 |